No. 713,855. Patented Nov. 18, 1902.
G. H. CLARK.
PNEUMATIC TIRE.
(Application filed Oct. 25, 1899. Renewed Aug. 11, 1902.)

(No Model.)

Witnesses:
H. B. Davis.
J. L. Hutchinson

Inventor:
George H. Clark
by B. J. Hayes
Atty

UNITED STATES PATENT OFFICE.

GEORGE H. CLARK, OF BOSTON, MASSACHUSETTS, ASSIGNOR TO THE CLARK CYCLE TIRE COMPANY, OF PORTLAND, MAINE, A CORPORATION OF MAINE.

PNEUMATIC TIRE.

SPECIFICATION forming part of Letters Patent No. 713,855, dated November 18, 1902.

Application filed October 25, 1899. Renewed August 11, 1902. Serial No. 119,224. (No model.)

*To all whom it may concern:*

Be it known that I, GEORGE H. CLARK, of Boston, county of Suffolk, and State of Massachusetts, have invented an Improvement in Pneumatic Tires, of which the following description, in connection with the accompanying drawings, is a specification, like letters on the drawings representing like parts.

In certain forms of pneumatic wheel-tires which have been produced a non-extensible strip has been incorporated in the tire, which formed a part of the tire, and said non-extensible strip was placed lengthwise entirely around the tread side of the tire. Some objections have been made to this tire for the reason that the resiliency of the tread of the tire appears to be somewhat reduced and also owing to the fact that the tire is liable to turn over sidewise under certain conditions, particularly when inflated quite hard. In practice I find that these objections are due to the particular location of the non-extensible strip.

This invention has for its object to improve the construction of the tire to the end that the objections above noted are overcome.

In accordance with this invention I employ two non-extensible strips, both made quite narrow and of suitable length to pass entirely around the tire lengthwise, and said narrow strips are located at each side of the tread and outside (*i. e.* toward the thread) of a diametrical line passing through the tire in parallelism with its axis. By so disposing said non-extensible strip I find in practice that the tire is properly stayed or reinforced when inflated and the resiliency of the tread is not reduced or impaired and that the required extensibility of the sides may be provided between the tread and rim and that the required extensibility of the bottom or rim side may also be provided, and, furthermore, I find that the tire has no tendency whatever to turn over sidewise, being positively held from turning in either direction by said non-extensible strips.

Figure 1:
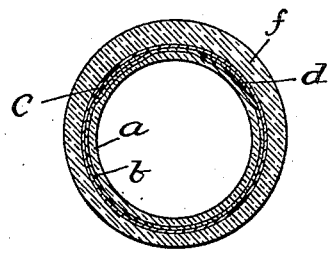
Figure 2:
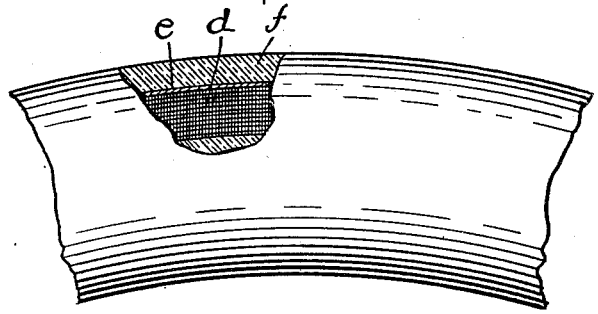
Figure 3:
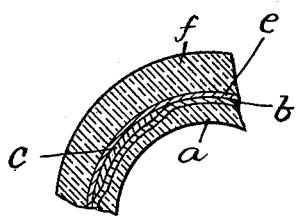

Figure 1 shows a cross-section of a pneumatic wheel-tire embodying this invention. Fig. 2 is a side view of a portion of the tire broken away to expose one of the non-extensible strips which is disposed at one side of the tread; and Fig. 3 is a sectional detail of a portion of the tire, taken on an enlarged scale.

*a* represents an air-tube, *b* an expansible covering therefor, which may be of canvas or other suitable material, and *c* and *d* represent two non-extensible strips located, as will be seen upon reference to the drawings, at each side of the tread of the tire.

*e* represents another expansible covering of canvas or other suitable material and *f* the outer covering. These several parts will be vulcanized together, as usual in the manufacture of pneumatic wheel-tires.

The two non-expansible strips *c* and *d* are both made quite narrow and being disposed at the points shown will properly stay or reinforce the tire when inflated, and yet will not reduce or in any manner impair the resiliency of the tread of the tire or the resiliency or extensibility of the sides of the tire between the tread and rim or the extensibility of the bottom or rim side of the tire, and, furthermore, the tire will be held or supported by said non-extensible strips in such manner that it cannot be turned over sidewise in either direction.

I do not desire to limit my invention to any particular manner of manufacturing or constructing the tire, as I desire to broadly include within the spirit and scope of this invention these two non-extensible strips disposed at substantially the points shown.

I claim—

A pneumatic wheel-tire comprising a number of expansible layers and two non-extensible strips passing entirely around the tire lengthwise and disposed at opposite sides of the tread of the tire, outside of a diametrical line passing through the tire in parallelism with its axis, substantially as described.

In testimony whereof I have signed my name to this specification in the presence of two subscribing witnesses.

GEORGE H. CLARK.

Witnesses:
 B. J. NOYES,
 J. L. HUTCHINSON.